United States Patent
Wielkopolski

(10) Patent No.: US 6,964,424 B2
(45) Date of Patent: Nov. 15, 2005

(54) DRIVE SYSTEM

(76) Inventor: Thomas William Wielkopolski, Cafe Castle, Lyndhurst/St. Lawrence, Somerset (GB)

(*) Notice: Subject to any disclaimer, the term of this patent is extended or adjusted under 35 U.S.C. 154(b) by 0 days.

(21) Appl. No.: 10/051,210

(22) Filed: Jan. 16, 2002

(65) Prior Publication Data

US 2002/0074767 A1 Jun. 20, 2002

Related U.S. Application Data

(63) Continuation of application No. PCT/GB00/02639, filed on Jul. 14, 2000.

(30) Foreign Application Priority Data

Jul. 17, 1999 (GB) .............................. 9916761

(51) Int. Cl.$^7$ .............................................. B62M 1/04
(52) U.S. Cl. ...................................... 280/252; 280/256
(58) Field of Search ............................... 280/252, 253, 280/254, 255, 256, 257, 258

(56) References Cited

U.S. PATENT DOCUMENTS

| | | | | |
|---|---|---|---|---|
| 719,595 | A | * | 2/1903 | Huss ........................... 280/252 |
| 3,877,724 | A | * | 4/1975 | Chase ......................... 280/241 |
| 4,053,173 | A | * | 10/1977 | Chase, Sr. .................. 280/253 |
| 4,456,276 | A | * | 6/1984 | Bortolin ...................... 280/257 |
| 4,564,206 | A | * | 1/1986 | Lenhardt ..................... 280/252 |
| 4,684,143 | A | * | 8/1987 | Sato ............................ 280/216 |
| 5,387,000 | A | * | 2/1995 | Sato ............................ 280/216 |
| 5,419,572 | A | | 5/1995 | Stiller et al. |
| 5,423,560 | A | * | 6/1995 | Warrick et al. ............. 280/216 |
| 5,833,257 | A | * | 11/1998 | Kohlheb et al. ............ 280/251 |

FOREIGN PATENT DOCUMENTS

| | | |
|---|---|---|
| DE | DE 4404831 | 12/1994 |
| WO | WO 9622911 | 8/1996 |
| WO | WO 0105647 | 1/2001 |

* cited by examiner

*Primary Examiner*—Daniel G. DePumpo
(74) *Attorney, Agent, or Firm*—Pollack P.C.; Grant E. Pollack

(57) ABSTRACT

A drive system for use in a bicycle or the like, which includes a manually-operable member and a drive train connected to the member for transferring drive from the member to at least one of the bicycle wheels. The member is mounted for substantially rectilinear reciprocating movement on a lever system having a first lever, a second lever and a tie rod. The first lever has a first end connected to a first pivot and a second end that is rotatable about the first pivot. The second lever has a first end that is pivotably connected to the second end of the first lever and a second end to which the manually-operable member is attached. As for the tie rod, it has a first end pivotably connected to the a second pivot and a second end that is pivotably connected to the second lever between the first and second ends thereof. The first lever is constructed and arranged for limited reciprocating rotation of the second end about the first pivot.

16 Claims, 6 Drawing Sheets

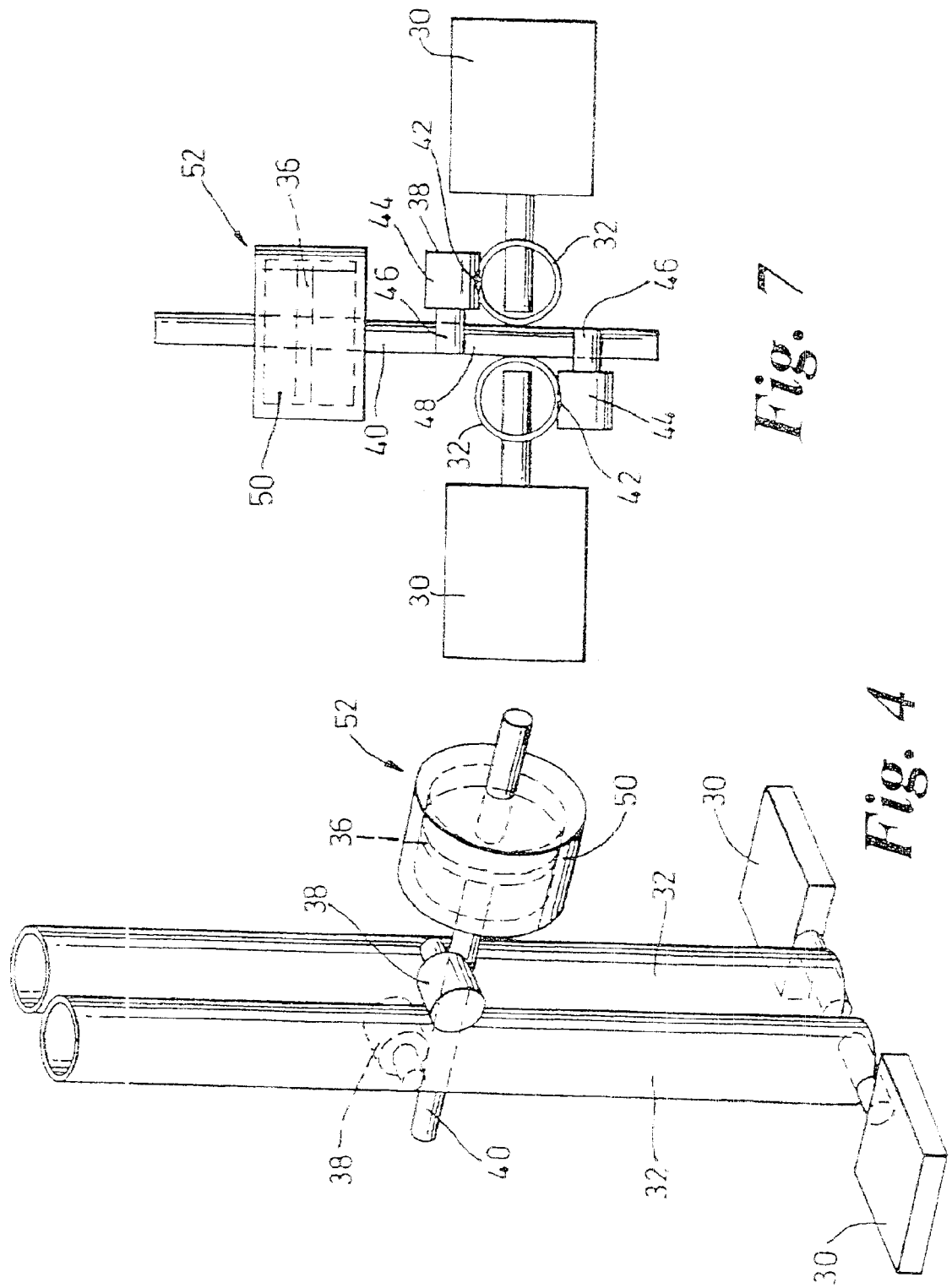

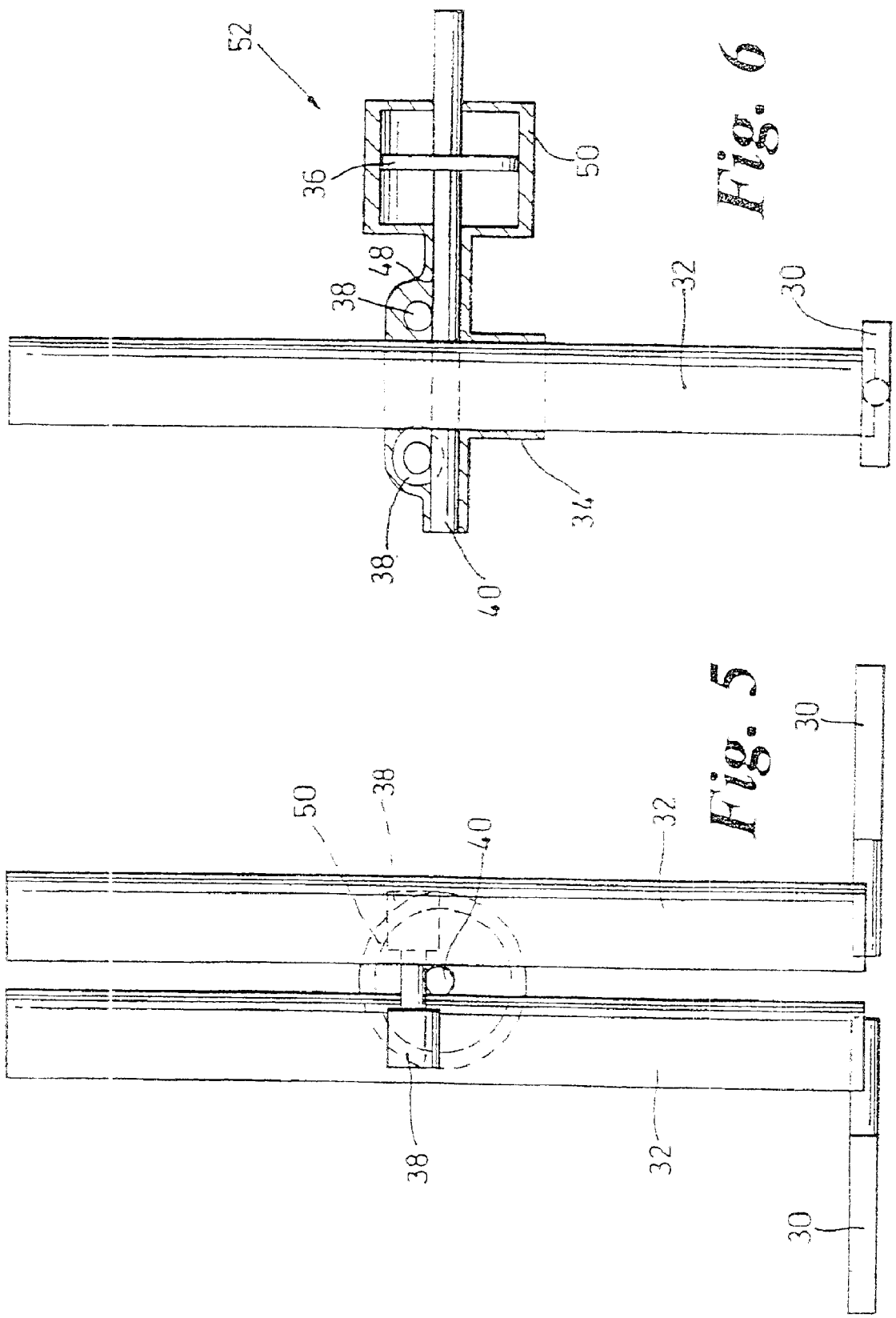

DRIVE SYSTEM

This is a continuation of PCT/GB/00/02639 filed Jul. 14, 2000, which claims priority to GB 9916761.1 filed Jul. 17, 1999.

FIELD OF THE INVENTION

The present invention relates generally to human-powered vehicles and mechanisms and, more particularly to a drive system for bicycles or the like.

BACKGROUND OF THE INVENTION

Drive systems for bicycles typically comprise a pair of rotating pedal cranks connected to the rear wheel of the bicycle by a chain and sprockets. Although these systems have been found useful, they also have inherent disadvantages. In particular, the tangential force exerted on the pedals by the cyclist varies considerably depending upon the relative position of the pedal cranks, the force generally being at a maximum only when the pedal cranks are approximately horizontal. This not only limits efficiency, but also the maximum power output of the cyclist.

Another approach utilizes a drive system having a drive link coupled by bearings to a crank and a tie rod. Drive forces are then transmitted by a cyclist from the drive link, through the crank, to the wheels of a bicycle. A system of this general description is provided, for example, in DE 4404831 A. A further conventional drive mechanism for bicycles has pedals attached to racks mounted for reciprocating movement. Such a mechanism is disclosed, for instance, in WO 96/22911.

OBJECTS AND SUMMARY OF THE INVENTION

It is, therefore, an object of the present invention to provide a drive system that not only improves efficiency, but also the maximum power output of a cyclist.

Another object of the present invention is to provide a bicycle with a drive system that enables a cyclist to provide greater power output and/or cycle more efficiently.

According to one aspect of the present invention, a drive system is provided suitable for use in a bicycle. The system includes a manually-operable member and a drive train connected to the member for transferring drive from the member to at least one of the bicycle wheels. The manually-operable member is preferably mounted for substantially rectilinear reciprocating movement on a lever system. The lever system includes a first lever having a first end connected to a first pivot, and a second end rotatable about the first pivot. A second lever is also provided, the second lever having a first end pivotably connected to the second end of the first lever and a second end to which the manually-operable member is attached. In addition, the lever system has a tie rod with a first end pivotably connected to a second pivot and a second end pivotably connected to the second lever between the first and second ends thereof. The first lever is desirably constructed and arranged for limited reciprocating rotation of the second end about the first pivot.

In accordance with another aspect of the present invention, a bicycle is provided having a drive system that includes a manually-operable member and a drive train connected to a member for transferring drive from the member to at least one of the bicycle wheels. The manually-operable member is preferably mounted for substantially rectilinear reciprocating mevement on a lever system. The lever system includes a first lever having a first end connected to a first pivot, and a second end rotatable about the first pivot. A second lever is also provided, the second lever having a first end pivotably connected to the second end of the first lever and a seond end to which the manually-operable member is attached. In addition, the lever system has a tie rod with a first end pivotably connected to a second pivot and a second end pivotably connected to the second lever between the first and second ends thereof. The first lever is desirably constructed and arranged for limited reciprocating rotation of the second end about the first pivot.

According to a further aspect of the present invention, a drive system is provided suitable for use in a bicycle. The system includes a manually-operable member and a drive train connected to the member for transferring drive from the member to at least one of the bicycle wheels. The manually-operable member is preferably mounted for substantially rectilinear reciprocating movement on a lever system. The lever system includes a first lever having a first end connected to a first pivot, and a second end rotatable about the first pivot. A second lever is also provided, the second lever having a first end pivotably connected to the second end of the first lever and a second end to which the manually-operable member is attached. In addition, the lever system has a tie rod with a first end pivotably connected to a second pivot and a second end pivotably connected to the second lever between the first and second ends thereof. The first lever is preferably constructed and arranged for limited reciprocating rotation of the second end about the first pivot. The drive system further includes a hydraulic drive pump connected through a hydraulic circuit to a hydraulic motor that, in use, is arranged to drive at least one bicycle wheel, the hydraulic motorbeing arranged to provide a gearing effect.

In accordance with yet another aspect of the present invention, a bicycle is provided having a drive system substantially as described above.

The present invention will now be further described by reference to the following drawings which are not intended to limit the accompanying claims.

BRIEF DESCRIPTION OF THE DRAWINGS

FIG. 4 is an isometric view of a drive system, according to another aspect of the present invention;

FIG. 5 is a front view of the drive system shown in FIG. 4;

FIG. 6 is a side view of the drive system illustrated in FIG. 4;

FIG. 7 is a plan view of the drive system shown in FIG. 4; and

The same numerals are used throughout the drawing figures to designate similar elements. Still other objects and advantages of the present invention will become apparent from the following description of the preferred embodiments.

DETAILED DESCRIPTION OF THE INVENTION

Figure 1:
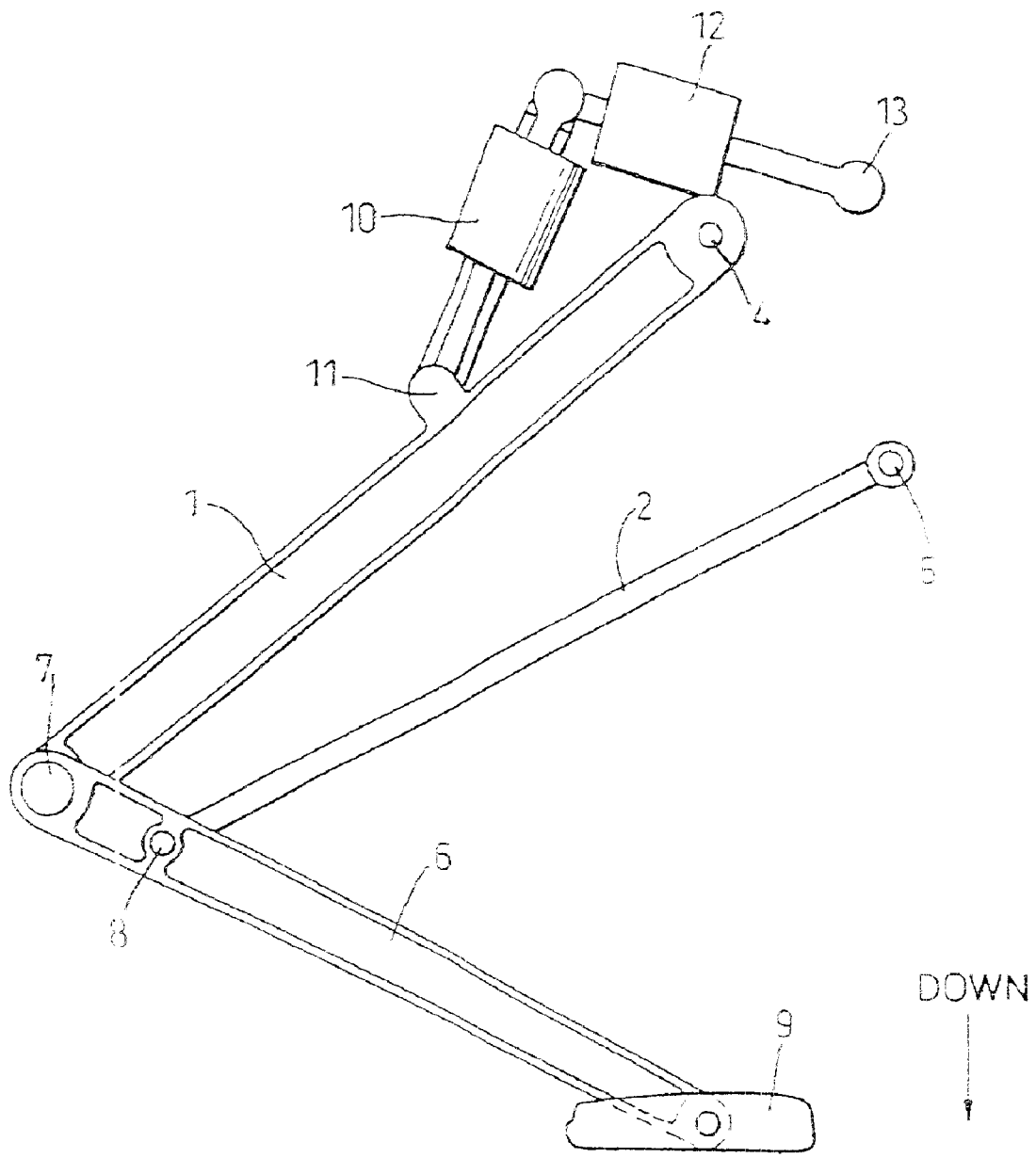
FIG. 1 is a side view of a drive system, according to one aspect of the present invention.
Figure 2:
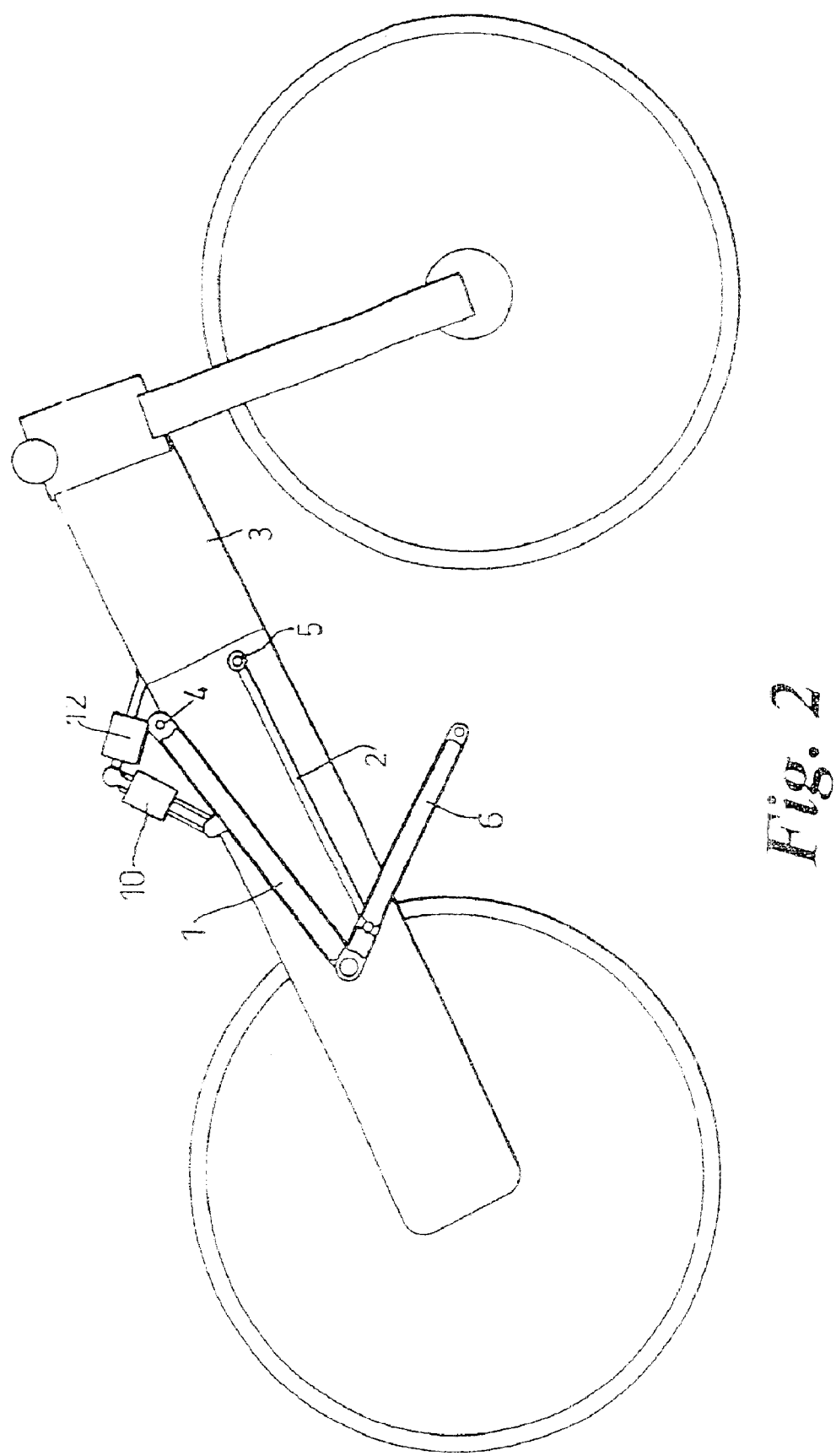
FIG. 2 is a side view of a bicycle having a drive system as shown in FIG. 1.

Referring now to the drawings and, more particularly, to FIGS. 1–8, there is shown generally a specific, illustrative drive system for bicycles or other pedal driven mechanisms, in accordance with various aspects of the present invention. According to one embodiment, system includes a first arm 1 and a second arm 2, which are attached to a bicycle frame 3 at their upper ends through first and second pivots 4,5. A lever 6 is attached to the lower ends of the first and second arms through third and fourth pivots 7,8, the third pivot 7 being located at one end of the lever and the fourth pivot 8 being located between the ends of the lever, close to the third pivot. A pedal 9 is attached to the free end of the lever, the arrangement being such that the pedal can move up and down substantially linearly, as indicated by the arrow labeled "down". These items may be duplicated in a generally symmetrical fashion for a second pedal.

The first arm is attached to a drive train to turn the wheels or drive the mechanism. In a preferred arrangement of the design, the drive train comprises a hydraulic drive cylinder 10, which is attached at its lower end to a pivot 11 on the first arm located between its ends. The hydraulic drive cylinder is attached at its upper end to the bicycle frame and a hydraulic adjuster 12. The hydraulic adjuster is also attached to the frame through a pivot 13 and may be actuated for adjusting the position of the upper end of the drive cylinder relative to the frame. The hydraulic drive cylinder pumps oil around a hydraulic system. This system shown in FIG. 3, has an oil reservoir 15, a regulation and control system 16, and one or more hydraulic motors 17.

When pressure is exerted on the pedal 9, lever 6 moves in the direction labeled "down" and rotates about pivot 7. The resulting reaction through second arm 2 forces first arm 1 to rotate about pivot 4, driving the hydraulic drive cylinder, which is arranged to pump oil around the hydraulic system. When pedal 9 reaches the end of possible movement, it is so arranged to return to its starting position at the opposite end of its range of movement. In so doing, hydraulic drive cylinder 10 is refilled with fluid and the cycle begins again. The components are so arranged that movement of hydraulic adjuster 12 has the effect of varying the amount of oil pumped around the system, thereby providing a continuously (i.e., steplessly) variable gearing system. The adjuster may be arranged in such a way that the fluid in the drive system operates the adjuster so as to provide automatic adjustment of the gear ratios. Alternatively or concurrently, both sides are connected to one another to ensure that the pedals move in opposite directions.

Figure 3:
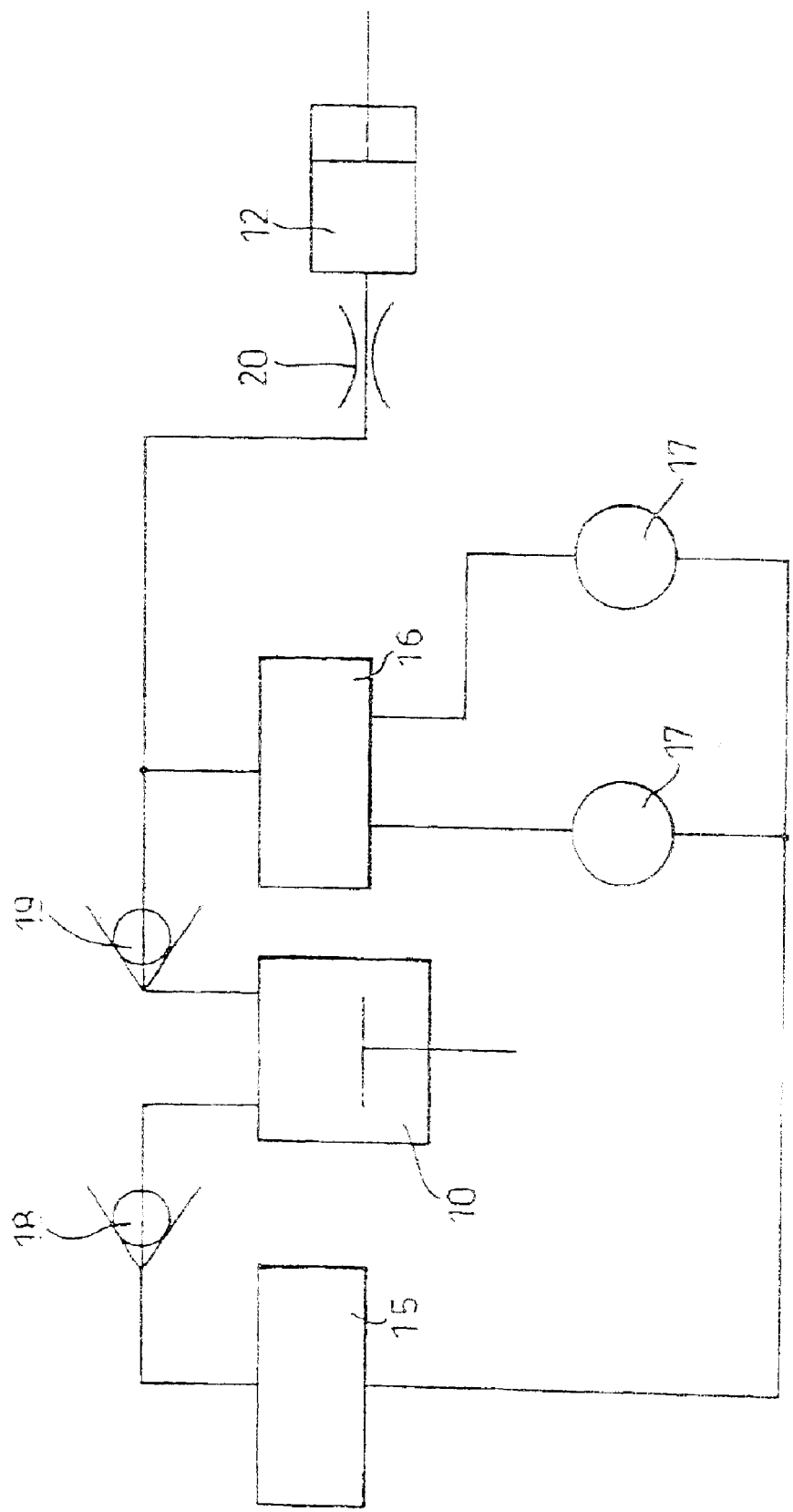
FIG. 3 is a hydraulic circuit diagram of a hydraulic drive train for use with the drive system of FIG. 1.

The hydraulic circuit may be arranged as shown in the diagram of FIG. 3, which is provided for clarity only. Fluid is drawn from reservoir 15 through a one way valve 18 to the hydraulic drive cylinder and pumped under pressure through another one way valve 19 to regulation and control system 16 and, hence, through motors 17, as required, then returning to the reservoir. A relatively small amount of fluid passes into a second control system 20 to actuate the hydraulic adjuster.

Alternatively, the hydraulic components are replaced by a gear, shaft or chain drive. In such arrangements provision is desirably made for relative movement of the pivots to provide a range of gear ratios.

The constituent parts are arranged so that the movement of the pedal and, hence, output is in relation to the force that can be exerted on the pedal. There is no point in the cycle of the present invention that a full force cannot be output by the system. By aligning the direction of pedal movement with the input force, the system makes more efficient use of the work energy available.

Alternatively, or concurrently, the drive cylinder may be connected to the second arm instead of the first arm; the lever to which the pedal is attached may be curved rather than straight; and the whole mechanism may be oriented differently, for example, when it is advantageous for the person operating the drive system to adopt a reclined position.

Another alternative embodiment of the drive system is illustrated in FIGS. 4 to 7. In this embodiment, pedals 30 are attached to the lower ends of two parallel pedal shafts 32. The shafts are mounted for axial movement in a housing 34 and are connected to a hydraulic drive piston 36 through a pair of transfer gears 3 8 and a piston shaft 40. The housing is shown in FIG. 6 but is omitted from the other figures for clarity.

Preferably, one face of each pedal shaft 32 is provided on one face with a gear rack 42. In the embodiment shown in the drawings, the rack is on the rear face of the left-hand pedal shaft, and on the front face of the right-hand pedal shaft.

The transfer gears 38 are mounted in the housing 34 with their axes generally perpendicular to the axes of the pedal shafts 32. Each transfer gear includes a large radius gear 44 at its outer end, which engages the rack 42 on the associated pedal shaft, and a smaller radius gear 46 at its inner end, which engages an associated gear rack 48 on the upper side of the piston shaft 40.

The piston shaft is mounted for axial movement in the housing and is connected at one end to hydraulic drive piston 36, which with a cylinder 50 forms a hydraulic drive pump 52. The drive pump is preferably connected through a hydraulic circuit to a drive motor. The drive motor may be a variable displacement motor for providing a gearing effect.

To operate the drive system, pedals 30 are pushed upwards and downwards by the rider, causing the pedal shafts to reciprocate. This reciprocating movement is transferred to the piston shaft by the transfer gears, which also increase the force and reduce the amplitude of the movement. This drives the hydraulic pump 52 which, in turn, drives the motor.

Figure 8:
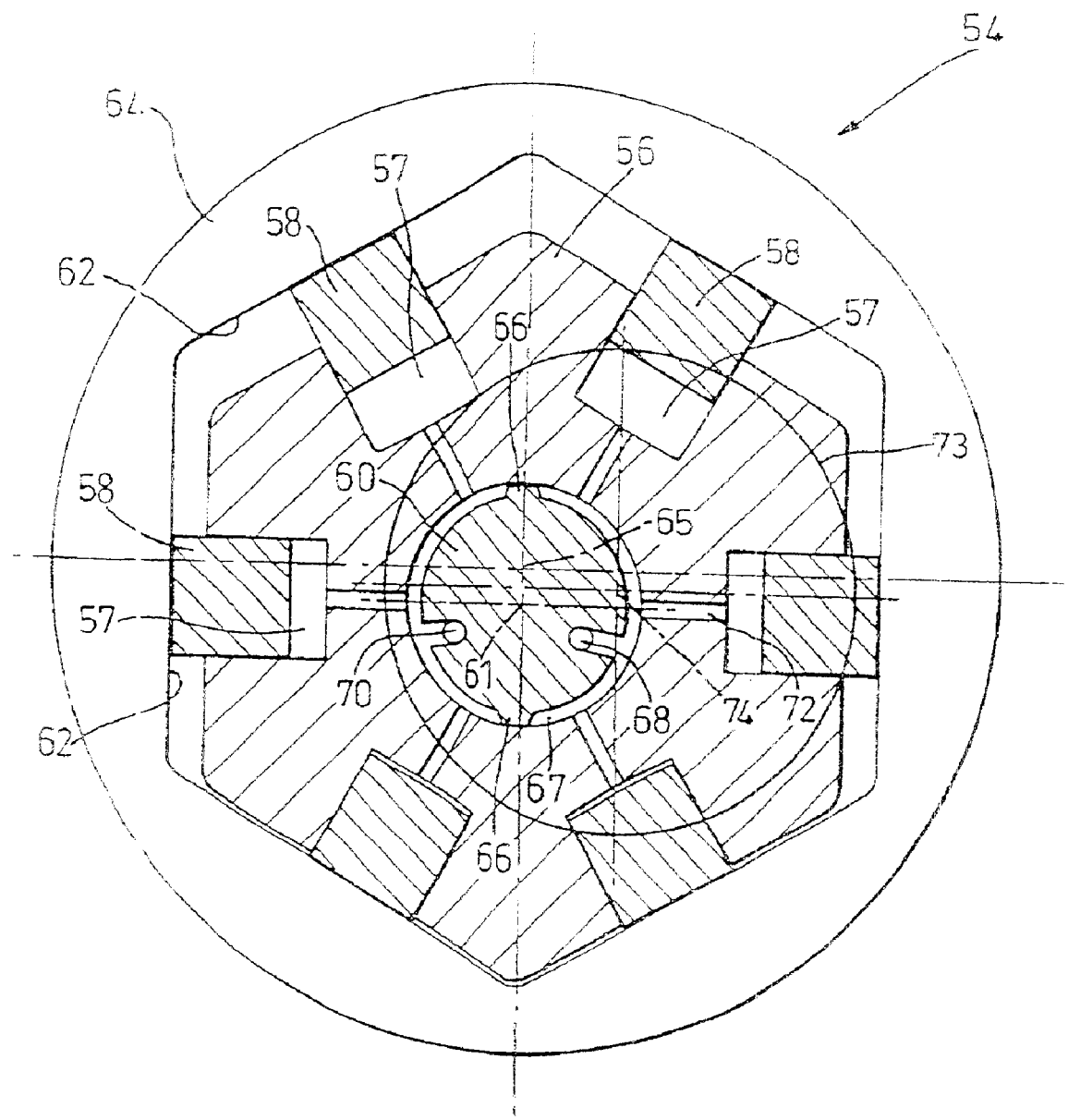
FIG. 8 is a sectional view of a variable displacement motor forming part of a drive system, in accordance with the present invention.

A suitable variable displacement motor or pump 54 is shown in FIG. 8. The motor includes a rotor 56 that is hexagonal in cross-section and has six cylinders 57 around its circumference, in each of which there is mounted a piston 48. The rotor is desirably mounted for rotation on a fixed, non-rotatable shaft 60 having a shaft axis 61. The six pistons 58 slidingly engage the inner hexagonal walls 62 of an outer housing 64. The outer housing is mounted on a mounting plate (not shown) for rotation about a housing axis 65 with the rotor, and is drivingly connected to one or both of the bicycle wheels.

Sealing walls 66 are provided on the shaft, which divide annular gap 67 between the shaft and the rotor into two halves. Oil is preferably fed to and drained from each half of this gap through an oil inlet opening 68 and an oil outlet opening 70 in the shaft. Vents 72 in the rotor extend between the gap and cylinders 57, allowing oil to drive the pistons.

The shaft is desirably mounted on an eccentric 73 having an axis of rotation 74 that can be rotated so as to vary the separation between shaft axis 61 and housing axis 65. This allows the swept volume of pump 54 to be varied, thereby adjusting the torque and gearing ratio. Optionally, stops (not shown) are used to limit rotation of the eccentric.

Although the present invention is shown and described as suitable for use in a bicycle, its application to driving other vehicles or mechanisms is understood, giving consideration to the purpose for which the present invention is intended.

In operation, oil is supplied under pressure through inlet opening 68 into gap 67 between the shaft and the rotor, and passes through vents 72 into the three cylinders 57 located on the inlet side of the gap, driving pistons 58 in the cylinders outwardly. Generally at the same time, oil is exhausted from the three cylinders on the outlet side of the gap and escapes through outlet opening 70. The relatively unbalanced force generated by the pistons creates a turning moment on the rotor, owing to the separation between shaft axis 61 and housing axis 65. Rotor 56 and outer housing 64, in turn, rotate about the shaft, thereby driving the wheel or wheels of the bicycle.

By rotating eccentric 73, separation between the shaft axis and the housing axis can be varied to adjust the torque and gearing ratio. Rotation of the eccentric may be controlled manually or automatically (for example, mechanically or hydraulically) to provide a self-regulating drive system.

According to still further alternative embodiment, as shown in the drawings, transfer gears 38 are arranged to engage gear racks on opposite sides of two pedal shafts 32, so that pedals 30 move in opposite directions. Further in the alternative, the the transfer gears can be arranged to engage gear racks on the same side of the two pedal shafts, and on opposite sides of pump shaft 40, in order to produce the same effect It is also possible to mount both transfer gears on a single shaft having its axis situated diagonally relative to the gear rack on the pump shaft.

Overall, the drive system, in accordance with present invention, advantageously utilizes two lever systems interconnected for opposing reciprocating movement, where each lever system includes a manually-operable member. This allows both of the user's feet, or hands, to be used to drive the system with alternating strokes.

In addition, each lever system, according to the present invention, advantageously produces the substantially rectilinear reciprocating movement of the manually-operable member, and is very efficient in operation. In particular, mounting the member for substantially rectilinear reciprocating movement allows a very efficient input of energy into the drive system from the user, avoiding the inefficiencies of traditional rotating crank systems. A bicycle equipped with the drive system of the present invention can, therefore, be ridden more rapidly and/or witb less effort. While it is preferred that the manually-operable member be a pedal or a pair of pedals, a handle may be used, alternatively or concurrently, within the spirit and scope of the present invention.

Optionally, the drive system also includes a hydraulic drive pump connected to a third pivot and to the first lever between the first and second ends thereof, for actuation by pivoting movement of the first lever. In addition, the system may include a device for adjusting the position of the third pivot relative to the first pivot, and thereby adjust the stroke length of the cylinder. Desirably, the adjuster device is a hydraulic adjuster.

A further benefit of the present invention is that the hydraulic drive pump may be connected, via a hydraulic circuit, to a hydraulic motor. By providing a hydraulic drive train, the present invention allows drive to be transferred more efficiently to the wheels, while adjusting stroke length of the hydraulic pump provides a simple method for adjusting the gearing effect of the drive system. Notably, if a hydraulic adjuster is used, an automatic or semiautomatic gearing system can be provided. While a hydraulic drive train is preferred, it is understood that the drive train may, alternatively, be entirely mechanical.

Alternatively, the manually-operable member is attached to a shaft mounted for axial reciprocating movement. Beneficially, a pair of shafts mounted substantially parallel to one another provide for axially reciprocating movement, each shaft having a manually-operable member attached thereto and being desirably interconnected for opposing reciprocating movement. By using two parallel shafts interconnected for opposing reciprocating movement, both of the user's feet or hands may be used to drive the system with alternating strokes.

Advantageously, the shafts are drivingly connected to a sub-shaft mounted for axial reciprocating movement, preferably substantially perpendicularly to the sub-shaft. The sub-shaft may be connected to a hydraulic drive pump that is, in turn, connected via a hydraulic circuit to a hydraulic motor. Again, use of a hydraulic drive train allows drive to be transferred more efficiently to the wheels.

Further advantageous is that the hydraulic drive motor is a variable capacity motor that allows the gearing effect of the drive system to be adjusted. The drive system includes a plurality of hydraulic motors and a member for connecting the motors into the hydraulic circuit individually, in series or in parallel, to adjust the gearing effect of the drive system.

According to still another aspect of the present invention, a bicycle is provided having a drive system as described above. The bicycle may include a hydraulic drive train having at least one hydraulic motor for driving the rear wheel, the front wheel or both wheels of the bicycle. The bicycle may also include a plurality of hydraulic motors that can be connected into the hydraulic circuit individually, in series or in parallel to adjust the gearing effect of the drive system.

Various modifications and alterations may be appreciated based on a review of this disclosure. These changes and additions are intended to be within the scope and spirit of the invention as defined by the following claims.

What is claimed is:

1. A drive system suitable for use in a bicycle, the drive system including a manually-operable member and a drive train connected to the manually-operable member for transferring drive from the manually-operable member to at least one of the bicycle wheels, wherein the manually-operable member is mounted for substantially rectilinear reciprocating movement on a lever system that includes a first lever having a first end connected to a first pivot and a second end rotatable about the first pivot, a second lever having a first end pivotably connected to the second end of the first lever and a second end to which the manually-operable member is attached, and a tie rod having a first end pivotably connected to a second pivot and a second end pivotably connected to the second lever between the first and second ends thereof; wherein the first lever is constructed and arranged for limited reciprocating rotation of the second end about the first pivot.

2. The drive system set forth in claim 1, wherein the manually-operable means is a pedal.

3. A drive system set forth in claim 1, including two lever systems interconnected for opposed reciprocating movement, each lever system including a manually-operable member.

4. The drive system set forth in claim 3, including a hydraulic drive pump connected to a third pivot and to the first lever between the first and second ends thereof, for actuation by pivoting movement of the first lever.

5. The drive system set forth in claim 4, including a device for adjusting the position of the third pivot relative to the first pivot, to adjust the stroke length of the cylinder.

6. The drive system set forth in claim 5, including a hydraulic adjuster for adjusting the position of the third pivot.

7. The drive system set forth in claim 4, wherein the hydraulic drive pump is connected through a hydraulic circuit to a hydraulic motor.

8. The drive system set forth in claim 7, wherein the hydraulic drive motor is arranged to provide a gearing effect to the system.

9. The drive system set forth in claim 7, wherein the hydraulic drive motor is a variable capacity motor.

10. The drive system set forth in claim 7, including a plurality of hydraulic motors and a control system for connecting the motors into the hydrauic circuit in series or in parallel to adjust the gearing effect of the drive system.

11. The drive system set forth in claim 1, wherein the tie rod is constructed and arranged for limited reciprocating rotation about the second pivot.

12. A bicycle having a drive system which includes a manually-operable member and a drive train connected to the manually-operable member for transferring drive from the manually-operable member to at least one of the bicycle wheels, wherein the manually-operable member is mounted for substantially rectilinear reciprocating movement on a lever system including a first lever having a first end connected to a first pivot and a second end rotatable about the first pivot, a second lever having a first end pivotably connected to the second end of the first lever and a second end to which the manually-operable member is attached, and a tie rod having a first end pivotably connected to a second pivot and a second end pivotably connected to the second lever between the first and second ends thereof; wherein the first lever is constructed and arranged for limited reciprocating rotation of the second end about the first pivot.

13. The bicycle set forth in claim 12, including a hydraulic drive train that includes at least one hydraulic motor for driving one or both wheels of the bicycle.

14. A drive system suitable for use in a bicycle, the drive system including a manually-operable member and a drive train connected to the manually-operable member for transferring drive from the manually-operable member to at least one of the bicycle wheels, wherein the manually-operable member is mounted for substantially rectilinear reciprocating movement on a lever system that includes a first lever having a first end connected to a first pivot and a second end rotatable about the first pivot, a second lever having a first end pivotably connected to the second end of the first lever and a second end to which the manually-operable member is attached, a tie rod having a first end pivotably connected to a second pivot and a second end pivotably connected to the second lever between the first and second ends thereof, wherein the first lever is constructed and arranged for limited reciprocating rotation of the second end about the first pivot, and the drive system further including a hydraulic drive pump connected through a hydraulic circuit to a hydraulic motor that, in use, is arranged to drive at least one bicycle wheel, wherein the hydraulic motor is arranged to provide a gearing effect.

15. The drive system set forth in claim 14, wherein the hydraulic motor is a variable capacity motor.

16. The drive system set forth in claim 14, wherein the tie rod is constructed and arranged for limited reciprocating rotation about the second pivot.

* * * * *